(12) United States Patent
Ishii et al.

(10) Patent No.: US 12,071,181 B2
(45) Date of Patent: Aug. 27, 2024

(54) ELECTRICAL DRIVE DEVICE AND ELECTRICAL POWER STEERING DEVICE

(71) Applicant: HITACHI AUTOMOTIVE SYSTEMS, LTD., Hitachinaka (JP)

(72) Inventors: Akira Ishii, Hitachinaka (JP); Narutoshi Yamada, Hitachinaka (JP); Hideyuki Hara, Hitachinaka (JP); Takuro Kanazawa, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 917 days.

(21) Appl. No.: 17/255,644

(22) PCT Filed: Jun. 21, 2019

(86) PCT No.: PCT/JP2019/024624
§ 371 (c)(1),
(2) Date: Dec. 23, 2020

(87) PCT Pub. No.: WO2020/008906
PCT Pub. Date: Jan. 9, 2020

(65) Prior Publication Data
US 2021/0261187 A1    Aug. 26, 2021

(30) Foreign Application Priority Data
Jul. 2, 2018   (JP) .................................. 2018-125789

(51) Int. Cl.
*B62D 5/04* (2006.01)
*B62D 6/10* (2006.01)
(Continued)

(52) U.S. Cl.
CPC ......... *B62D 5/0406* (2013.01); *B62D 5/0421* (2013.01); *B62D 6/10* (2013.01); *H02K 5/225* (2013.01); *H02K 11/33* (2016.01)

(58) Field of Classification Search
CPC ....... B62D 5/0406; B62D 5/0421; B62D 6/10
See application file for complete search history.

(56) References Cited

U.S. PATENT DOCUMENTS 10,014,745 B2   7/2018 Fujimoto
10,167,012 B2 * 1/2019 Asao ....................... H02P 25/22
(Continued)

FOREIGN PATENT DOCUMENTS

JP         11-307181        11/1999
JP     H 11307181 A    *  11/1999
(Continued)

OTHER PUBLICATIONS

International Search Report dated Aug. 13, 2019 issued in International Application No. PCT/JP2019/024624, with English translation, 11 pages.

(Continued)

*Primary Examiner* — Kevin Hurley
(74) *Attorney, Agent, or Firm* — FOLEY & LARDNER LLP

(57) ABSTRACT

An electric drive device includes: an electronic control section including a first electronic control section and a second electronic control section which constitute a redundant system, the first electronic control section and the second electronic control section being provided with a first control section side connecter and a second control section side connecter which have an identical configuration, and the first non-control section side connecter being engaged with the first control section side connecter, and the second non-control section side connecter being engaged with the second control section side connecter to correspond to the lengths of the first harness and the second harness.

8 Claims, 8 Drawing Sheets

(51) Int. Cl.
  *H02K 5/22*    (2006.01)
  *H02K 11/33*   (2016.01)

(56) References Cited

U.S. PATENT DOCUMENTS

| | | | |
|---|---|---|---|
| 10,214,233 B2* | 2/2019 | Yamasaki | B62D 5/0463 |
| 2016/0254732 A1* | 9/2016 | Kojima | B62D 5/0406 |
| | | | 310/68 R |
| 2017/0279209 A1* | 9/2017 | Kitajima | H01R 13/64 |
| 2019/0126973 A1* | 5/2019 | Yamasaki | H02P 6/16 |
| 2019/0351935 A1* | 11/2019 | Kim | B62D 5/0406 |

FOREIGN PATENT DOCUMENTS

| | | |
|---|---|---|
| JP | 2004-268611 | 9/2004 |
| JP | 2016-144380 | 8/2016 |
| JP | 2017-174693 | 9/2017 |
| JP | 2017-189033 | 10/2017 |
| WO | WO-2016-063367 | 4/2016 |

OTHER PUBLICATIONS

Written Opinion of the International Searching Authority dated Aug. 13, 2019 issued in International Application No. PCT/JP2019/024624, with English translation, 15 pages.

International Preliminary Report on Patentability dated Jan. 14, 2021 issued in International Application No. PCT/JP2019/024624, 19 pages.

* cited by examiner

ELECTRICAL DRIVE DEVICE AND ELECTRICAL POWER STEERING DEVICE

TECHNICAL FIELD

This invention relates to an electric drive device and an electric power steering device, more specifically to an electric drive device and an electric power steering device in which an electronic control section is installed.

BACKGROUND ART

In a general industrial machinery field, mechanical control elements are driven by an electric motor. In recent years, an electric drive device of a mechatronical integration (machine/electric integral) type is started to be employed. The electric drive device of the mechatronical integration type represents a configuration in which an electronic control section which includes semiconductor elements and so on, and which controls a rotation speed and a rotation torque of the electric motor is integrally assembled in the electric motor.

An electric power steering device for a vehicle is an example of the electric drive device of the mechatronical integration. The electric power steering device is configured to sense the pivot direction and pivot torque of the steering shaft configured to be pivoted by the operation of the steering wheel by the driver, to drive the electric motor to be pivoted in a direction identical to the pivot direction of the steering shaft based on the detection value, and thereby to generate the steering assist torque. The power steering device includes an electronic control section (ECU: Electronic Control Unit) for controlling the electric motor.

For example, Japanese Patent Application Publication No. 2016-144380 (patent document 1) is known as a conventional electric power steering device. This patent document 1 describes the electric power steering device constituted by the electric motor section and the electronic control section. The electric motor of the electric motor section is received within a receiving space formed in a motor housing including a cylindrical portion made from the aluminum alloy and so on. A circuit substrate on which the electronic components of the electronic control section are mounted is received within a receiving space formed in an end surface wall portion on a side opposite to an output shaft in an axial direction of the motor housing, by a cover made from the synthetic resin, or the metal.

The circuit substrate of the electronic control section mounted to the end surface wall portion of the motor housing includes an electric power conversion circuit section including power switching elements such as the MOSFET and the IGBT which are configured to drive and control the electric motor; and a control circuit section configured to control a power source circuit section configured to produce the power source voltage, and the power switching elements. Output terminals of the power switching elements and an input terminal of the electric motor are electrically connected with each other through bas bars.

Moreover, in recent years, the wiring of the electric motor has the dual system. A redundant system (dual system) in which the wiring of the electric motor has the dual system, and in which the wirings of the dual system are controlled, respectively, by electronic control sections having the same configuration is proposed. For example, in the redundant system (dual system) shown in Japanese Patent Application Publication No. 2016-554994 (patent document 2), the combination of the first electronic control section and the second electronic control section serve as the regular electronic control section. When the abnormality or the malfunction is generated in one of the electronic control sections, the electric motor is controlled and driven by half power (ability) by the other of the electronic control sections. In this case, the power (capacity) of the electric motor becomes half. However, "power steering function" is ensured. Besides, the patent document 2 has the redundant system. Accordingly, connecters of the power source connecter and so on are independently provided to the respective electronic control sections.

Besides, an electric brake and electric hydraulic control devices for the hydraulic control, and so on are known as the electric drive device in which the electronic control section is integrated. However, in the following explanation, the electric power steering device is explained as the representation.

PRIOR ART DOCUMENT

Patent Document

Patent Document 1: Japanese Patent Application Publication No. 2016-144380

Patent Document 2: Japanese Patent Application Publication No. 2016-554994

SUMMARY OF THE INVENTION

Problems which the Invention is Intended to Solve

In the electronic control section of the redundant system, it is required to independently control the respective systems. It is considered that the respective electronic control sections are divided into "master system" and "slave system".

Accordingly, the consistency of the combination between the power source connecters (hereinafter, referred to as a control section side power source connecter) connected to the respective electronic control sections, and the power source connecters (hereinafter, referred to as a power source section side power source connecter) which are engaged to be detachable from the first and second control section side power source connecters, and which are connected through the power source harnesses to the vehicle power source section (the battery) is required. It is required to avoid the erroneous assembly of the control section side power source connecter, and the power source section side power source connecter.

In a case where the external appearance shapes of the control section side power source connecters and the power source section side power source connecters of the respective systems are formed into utterly different shapes for avoiding the erroneous assembly of the control section side power source connecters and the power source section side power source connecters, the distinguishment is easy. However, it is preferable that the external appearance shapes are identical to each other in consideration of the mass productivity of the respective power source connecters, and so on.

However, in a case where the control section side power source connecter and the power source section side power source connecter of the respective systems are formed into the identical shape, the vibration acted to the control section side power source connecter, and the power source section side power source connecter, and the mechanical influence of the external force such as the interference of the external device become identical. Consequently, the control section side power source connecter and the power source section side power source connecter of the respective systems may be malfunctioned at the same time.

In this way, when the malfunction is instantaneously generated in the control section side power source connecter and the power source section side power source connecter of the respective systems, the power steering function of the redundant system is lost. Accordingly, it is necessary to suppress the erroneous assembly of the control section side power source connecters and the power source section side power source connecters of the respective systems, and to suppress the instantaneous generation of the malfunctions of the control section side power source connecters and the power source section side power source connecters of the respective systems.

It is an object of the present invention to provide an electric drive device and an electric power steering device configured to suppress the erroneous assembly of the power source connecters of the respective systems, and to suppress the instantaneous generation of the malfunctions of the power source connecters of the respective systems.

Means for Solving The Problem

According to one aspect of the present invention, the device includes the electronic control section including a first electronic control section and a second electronic control section which constitute a redundant system, the first electronic control section and the second electronic control section being provided with a first control section side connecter and a second control section side connecter which have an identical configuration, the first control section side connecter and the second control section side connecter which have different axial lengths in a direction in which the respective connecters extend (hereinafter, referred to as an axial direction), a first non-control section side connecter and a second non-control section side connecter which are common to the first control section side connecter and the second control section side connecter, and which are provided at tip ends of a first harness and a second harness that have lengths determined in accordance with the axial heights of the first control section side connecter and the second control section side connecter, the first non-control section side connecter being engaged with the first control section side connecter, and the second non-control section side connecter being engaged with the second control section side connecter to correspond to the lengths of the first harness and the second harness.

According to another aspect of the present invention, the device includes the electronic control section including a first electronic control section and a second electronic control section which constitute a redundant system, and which are connected to a vehicle power source section; the first electronic control section and the second electronic control section being provided with a first control section side power source connecter and a second control section side power source connecter which have an identical configuration, the first control section side power source connecter and the second control section side power source connecter which have different axial lengths in a direction in which the respective power source connecters extend (hereinafter, referred to as an axial direction), a first power source section side power source connecter and a second power source section side power source connecter which are common to the first control section side power source connecter and the second control section side power source connecter, and which are provided at tip ends of a first power source harness and a second power source harness that have lengths determined in accordance with the axial heights of the first control section side power source connecter and the second control section side power source connecter, the first power source section side power source connecter being engaged with the first control section side power source connecter, and the second power source section side power source connecter being engaged with the second control section side power source connecter to correspond to the lengths of the first power source harness and the second power source harness.

Benefit of the Invention

In the aspect of the present invention, the non-control section side connecter (the power source section side power source connecter) is connected to the control section side connecter (the control section side power source connecter) to correspond to the lengths of the harness (the power source harness). Accordingly, it is possible to suppress the erroneous assembly. Moreover, the axial lengths of the respective control section side connecters are different from each other. Consequently, the mechanical influences based on the external force and so on are difference from each other. Therefore, it is possible to decrease the possibility of the instantaneous malfunction.

DESCRIPTION OF EMBODIMENTS

Hereinafter, one embodiment according to the present invention is explained in detail with reference to the drawings. However, the present invention is not limited to this embodiment. Variations and applications are included in the technical concept of the present invention.

A configuration of a steering device and a configuration of an electric power steering device are briefly explained as one example to which the present invention is applied, with reference to FIG. 1 to FIG. 4, before the embodiment of the present invention is explained.

Figure 1:
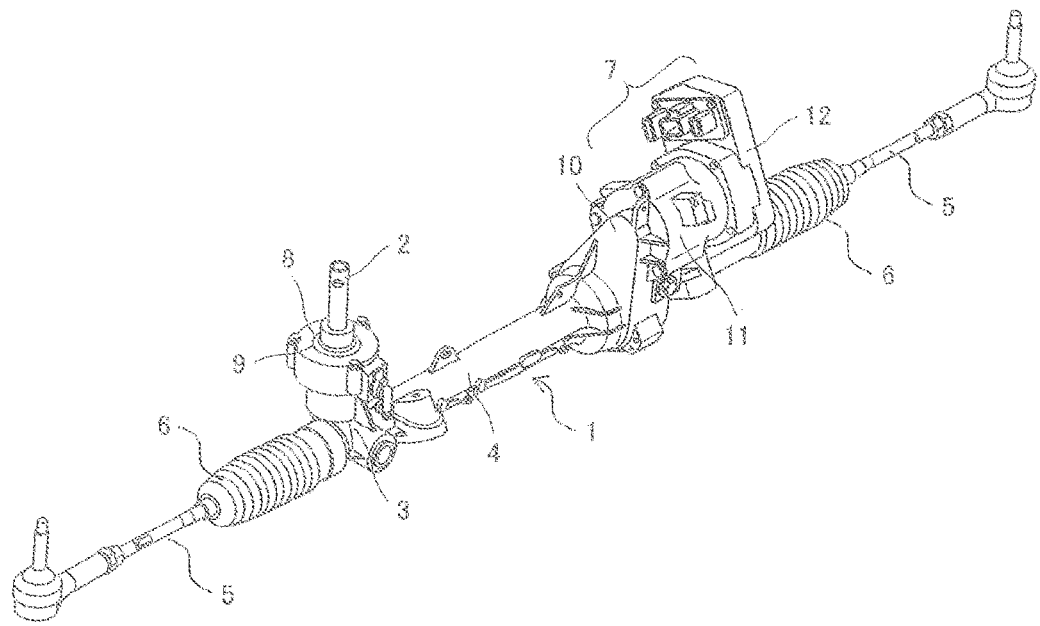
FIG. 1 is an overall perspective view showing one example of a steering device to which the present invention is applied.

Firstly, a steering device for steering (turning) front wheels of a vehicle is explained. The steering device 1 is constituted as shown in FIG. 1. A pinion 3 is provided to a lower end of a steering shaft 2 connected to a steering wheel (not shown). This pinion 3 are engaged with a rack shaft extending in leftward and rightward directions of a vehicle body. Tie rods 5 are connected to both ends of this rack shaft. The tie rods 5 are configured to steer (turn) the front wheels in the leftward and rightward directions. The rack shaft is covered with a rack housing 4. A rubber boot 6 is provided between the rack housing 4 and the tie rod 5.

An electric power steering device 7 is provided for assisting the torque when the steering wheel is operated to be pivoted. That is, there are provided a torque sensor 8 and a steering angle sensor 9 which are configured to sense a pivot direction and a pivot torque of the steering shaft 2. Moreover, there are provided an electric motor section 11 configured to provide a steering assist force through a speed reduction gear section 10 to the rack shaft based on the detection value of the torque sensor 8; and an electronic control unit 12 which is provided adjacent to the electric motor section 11, and which is configured to control the electric motor.

Moreover, three portions of the outer circumference portion of the electric motor section 11 of the electric power steering device 7 on the output shaft side are connected through bolts (not shown) to the speed reduction gear section 10. The electronic control unit 12 is provided on a side opposite to the output shaft of the electric motor section 11.

In the electric power steering device 7, when the steering shaft 2 is operated and pivoted in one direction by the operation of the steering wheel, the torque sensor 8 senses the pivot direction and the pivot torque of the steering shaft 2. A control circuit section of the electronic control unit 12 calculates the drive operation amount of the electric motor based on this detection value.

The electric motor is driven by power switching elements of an electric power conversion circuit section based on this calculated drive operation amount. The output shaft of the electric motor is driven and pivoted in a direction identical to the operation direction of the steering shaft 2. The pivot of the output shaft is transmitted from pinions (not shown) through the speed reduction gear section 10 to the rack shaft so that the vehicle is steered. These explanations are omitted since these configurations and operations have been already well known.

Figure 2:
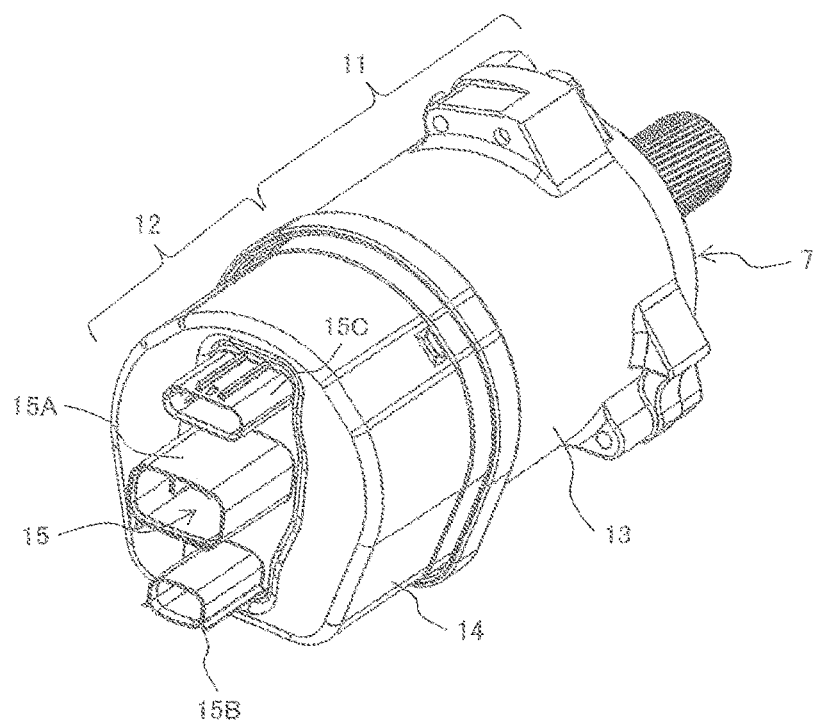
FIG. 2 is a perspective view showing an electric power steering device shown in FIG. 1.

FIG. 2 shows an outer appearance of the electric power steering device 7. This electric power steering device 7 has a configuration different from the configuration of the electronic control unit 12 of the electric power steering device 7 shown in FIG. 1. However, this electric power steering device 7 has a function identical to a function of the electric power steering device 7.

In FIG. 2, the electric motor section 11 constituting the electric power steering device 7 is constituted by a motor housing 13 having a cylindrical portion made from the aluminum alloy and so on, and an electric motor (not shown) received in the motor housing 13. The electronic control unit 12 is constituted by a metal cover 14 disposed on a side opposite to the output shaft in the axial direction of the motor housing 13, and made from the aluminum alloy and so on, and an electronic control section (not shown) received in the metal cover 14.

The motor housing 13 and the metal cover 14 are integrally fixed with each other on confronting surfaces of the motor housing 13 and the metal cover 14 by the adhesive, the welding, or the fixing bolts. The electronic control section is received within the receiving space within the metal cover 14. The electronic control section includes a power source circuit section configured to generate the necessary electric power; an electric power conversion circuit including power switching elements constituted by the MOSFET, the IGBT, or so on which are configured to drive and control the electric motor of the electric motor section 11; and the control circuit section configured to control these power switching elements. Output terminals of the power switching elements and a coil input terminal of the electric motor are electrically connected with each other through bas bars.

A connecter terminal assembly 15 is fixed on an axial end surface of the motor housing 13 by fixing bolts. The metal cover 14 is fixed to the motor housing 13 to cover the connecter terminal assembly 15. The connecter terminal assembly 15 includes first and second control section side power source connecters 15A and 15B for the electric power supply; and a detection sensor connecter 15C. Besides, in FIG. 2, the control section side power source connecter 15A and the control section side power source connecter 15B have different shapes. This is different from a below-described embodiment according to the present invention.

The electronic control section received within the metal cover 14 receives the electric power from the vehicle power source section (the battery) through the first and second control section side power source connecters 15A and 15B which are for the electric power supply, and which are made from the synthetic resin. The electronic control section receives the detection signals such as the driving state from the detection sensors through the detection sensor connecter 15C.

Figure 3:
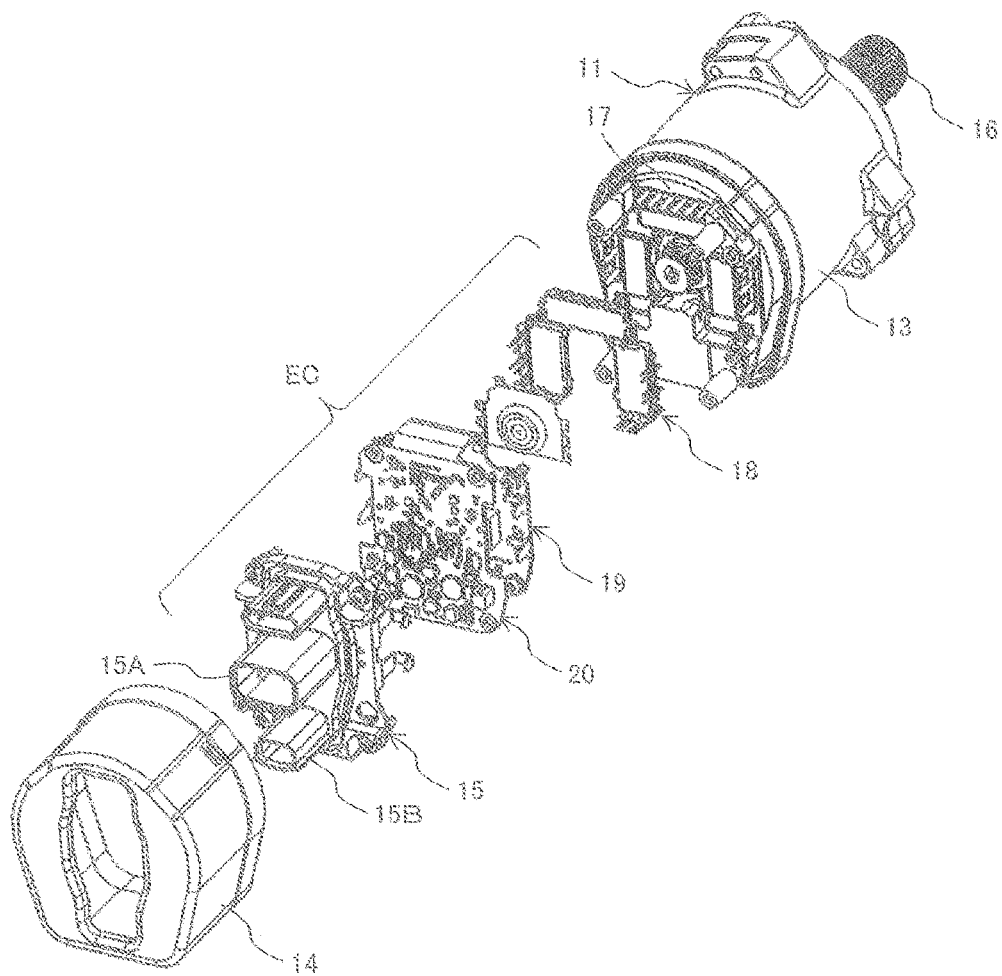
FIG. 3 is an exploded perspective view showing an electronic control section of the electric power steering device shown in FIG. 2.

FIG. 3 shows an exploded perspective view of the electric power steering device 7. An annular side yoke (not shown) made from the metal is mounted in the motor housing 13. The electric motor (not shown) is received within the side yoke. An output portion 16 of the electric motor is configured to provide the steering assist force to the rack through the gears.

The motor housing 13 is made from the aluminum alloy. The motor housing 13 has a heat sink function to store the heat generated in the electric motor, and the heat generated in the power source circuit section and the electric power conversion circuit section described later, by the thermal capacity of the motor housing 13, and then to discharge the heat to the external atmosphere. The electric motor section 11 is constituted by the electric motor and the motor housing 13.

An electronic control section ECU is mounted to an end surface wall portion 17 of the motor housing 13 on a side opposite to the output portion 16 of the electric motor section 11. The electronic control section ECU includes the electric power conversion circuit section 18, the power source circuit section 19, the control circuit section 20, and the connecter terminal assembly 15. The end surface wall portion 17 is integrally formed with the motor housing 13. However, the end surface wall portion 17 may be formed as an independent member. The end surface wall portion 17 may be integrally formed with the motor housing 13 by the bolts or the welding.

In this case, the electric power conversion circuit section 18, the power source circuit section 19, and the control circuit section 20 constitute a redundant system, and constitute a dual system of the electronic control section A and the electronic control section B. The electric motor is normally controlled and driven by the electronic control section A and the electronic control section B. When the abnormality or the malfunction is generated in one of the electronic control sections, the electric motor is controlled and driven by the other of the electronic control sections. That is, the combination of the electronic control section A and the electronic control section B serve as the regular electronic control section. When the abnormality or the malfunction is generated in one of the electronic control sections, the electric motor is controlled and driven by half power (ability) by the other of the electronic control sections. In this case, the power (ability) of the electric motor becomes half. However, "power steering function" is ensured.

The electronic control section ECU of the dual system includes the electric power conversion circuit section 18, the power source circuit section 19, the control circuit section 20, and the connecter terminal assembly 15. The electric power conversion circuit section 18, the power source circuit section 19, the control circuit section 20, and the connecter terminal assembly 15 are disposed in this order toward a direction apart from the end surface wall portion 17 side.

The control circuit section 20 is configured to generate the control signal for driving the power switching elements of the electric power conversion circuit section 18. The control circuit section 20 includes a microcomputer, peripheral circuits and so on. The power source circuit section 19 is configured to produce the power source voltage for driving the control circuit section 20, and the power source voltage of the electric power conversion circuit section 18. The power source circuit section 19 is constituted by condensers, coils, switching elements, and so on. The electric power conversion circuit section 18 is configured to adjust the electric powers flowing in three phase coils of the electric motor. The electric power conversion circuit section 18 is constituted by the power switching elements constituting three phase upper and lower arms, and so on.

The connecter terminal assembly 15 made from the synthetic resin is provided between the control circuit section 20 and the metal cover 14. The connecter terminal assembly 15 is connected to the vehicle power source section (the battery) and the sensors. The terminals embedded in the connecter terminal assembly 15 are electrically connected to the electric power conversion circuit section 18, the power source circuit section 19, and the control circuit section 20.

The metal cover 14 receives the electric power conversion circuit section 18, the power source circuit section 19, and the control circuit section 20 to liquid-tightly seal the electric power conversion circuit section 18, the power source circuit section 19, and the control circuit section 20. In this embodiment, the metal cover 14 is fixed to the motor housing 13 by the welding. This metal cover 14 is made from the metal. Accordingly, the metal cover 14 has a function to discharge the heat generated by the electric power conversion circuit section 18, the power source circuit section 19, and so on to the outside.

Figure 4:
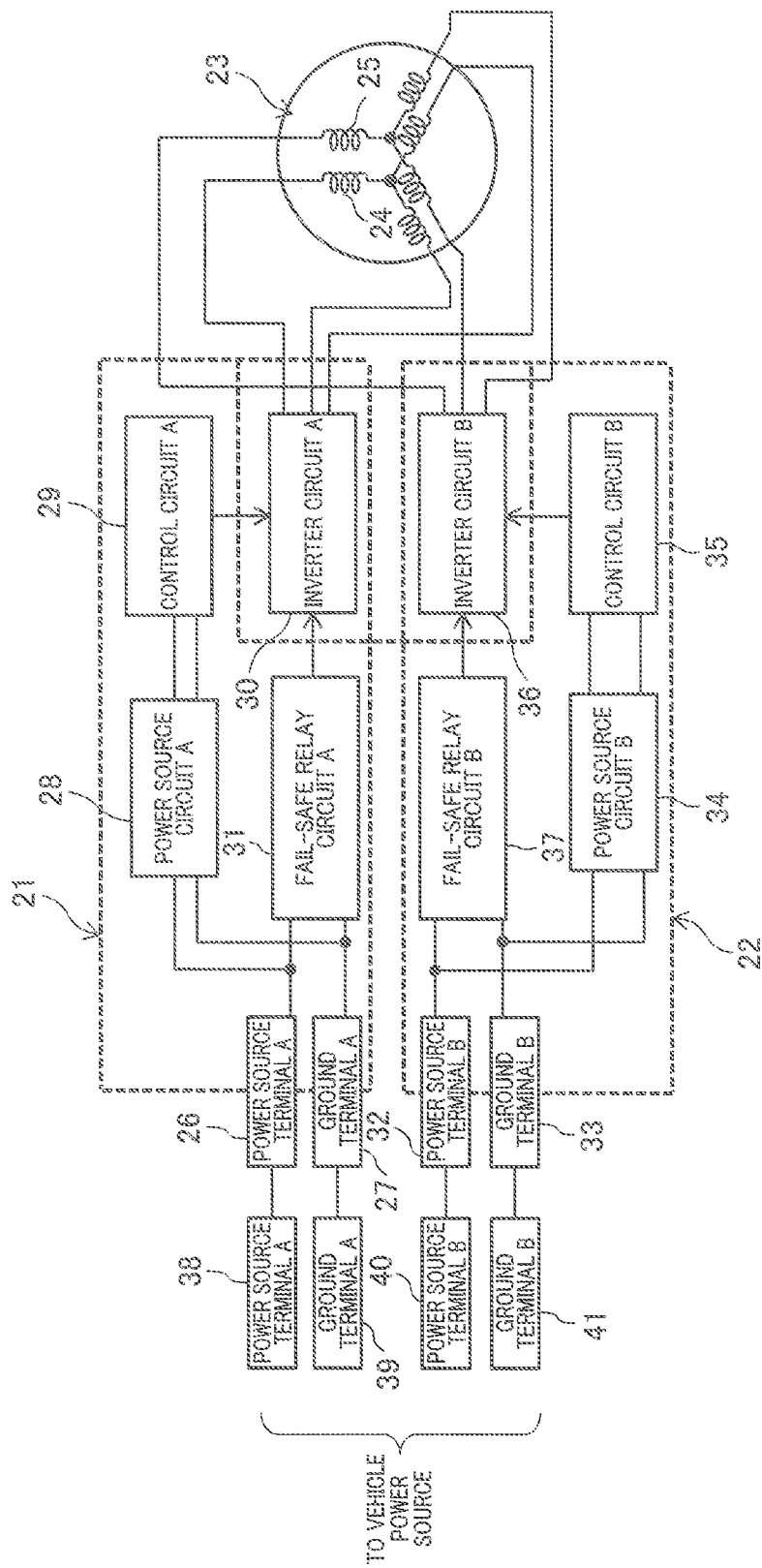
FIG. 4 is an explanation view for explaining a control block constituting the electronic control section shown in FIG. 3.

FIG. 4 shows a control block of the electronic control section ECU provided to the electric power steering device

7. The electronic control section ECU is constituted as the reductant system. The electronic control section ECU includes the first electronic control section (hereinafter, referred to as the electronic control section A) 21 and the second electronic control section (hereinafter, referred to as the electronic control section B) 22. The electronic control section A21 and the electronic control section B22 are configured to control and drive, respectively, an electromagnetic coil A24 and an electromagnetic coil B25 of the electric motor 23 which are divided into two.

The electronic control section A21 is connected to a power source terminal A26 and a ground terminal A27. The electronic control section A21 is configured to supply the electric power to a control circuit A29 through the power source circuit section 19 connected to the power source terminal A26. The power source terminal A26 and the ground terminal A27 are installed in the first control section side power source connecter 15A. The power source terminal A26 and the ground terminal A27 are connected to the power source terminal A38 and the ground terminal A39 on the power source side which are connected to the vehicle power source section (the battery) by a first power source harness. The power source terminal A26 and the ground terminal A27 are detachable the power source terminal A38 and the ground terminal A39. Moreover, the power source terminal A38 and the ground terminal A39 are installed in the power source section side power source connecter.

The control circuit A29 is configured to supply the control signal to switching elements of an inverter circuit A30. The inverter circuit A30 is configured to control the supply of the electric powers to the respective phases of the electromagnetic coil A24. Moreover, the inverter circuit A30 is connected to a failsafe relay circuit A31. When the abnormality or the malfunction is generated, the failsafe relay circuit A31 is configured to shut off a neutral point of the electromagnetic coil A24, and to stop the operation of the electronic control section A21.

On the other hand, the electronic control section B22 has the identical configuration. The electronic control section B22 is connected to the power source terminal B32 and the ground terminal B33. The electronic control section B22 is configured to supply the electric power to the control circuit B35 through the power source circuit B34 connected to the power source B32. The power source terminal B32 and the ground terminal B33 are installed in the second control section side power source connecter 15B. Moreover, the power source terminal B32 and the ground terminal B33 are connected to a power source side terminal B40 and a ground side terminal B41 on the power source side which are connected to the vehicle power source section (the battery) by a second power source harness. The power source terminal B32 and the ground terminal B33 are detachable from the power source side terminal B40 and the ground side terminal B41. The power source side terminal B40 and the ground side terminal B41 are installed in the power source section side power source connecter.

The control circuit B35 is configured to supply the control signal to switching elements of an inverter circuit B36. The inverter circuit B36 is configured to control the supply of the electric powers to the respective phases of the electromagnetic coil B25. Moreover, the inverter circuit B36 is connected to a failsafe relay circuit B37. When the abnormality or the malfunction is generated, the failsafe relay circuit B37 is configured to shut off a neutral point of the electromagnetic coil B25, and to stop the operation of the electronic control section B22.

Besides, the power source terminal A26 and the power source terminal B32 use the common vehicle power source section (the battery). The power source terminal A26 and the power source terminal B32 are configured to supply the same voltage. Moreover, the ground terminal A27 and the ground terminal B33 are connected in common to the ground. Moreover, circuit constituting components of the power source circuits 28 and 34, the control circuits 29 and 35, filter/failsafe relay circuits 31 and 37, and so on are electric/electronic components. These electric/electronic components are disposed on the substrate, and electrically connected with each other by the wiring.

In the operation of the electronic control section ECU in the normal state, both of the electronic control section A21 and the electronic control section B22 are operated. Share rates of the electric power transmitted to the electromagnetic coil A24 and the electromagnetic coil B25 of the electric motor 23 are respectively 50%. When the abnormality or the malfunction is generated in one of the electronic control sections 21 and 22, the one of the electronic control sections 21 and 22 in which the abnormality or the malfunction is generated is stopped. The electric motor 23 is controlled and driven by the other of the electronic control sections 21 and 22. With this, the power is decreased to the half. However, the "power steering function" is ensured.

In the electronic control section having the dual system, the consistency of the combination between the first and second control section side power source connecters 15A and 15B connected, respectively, to the electronic control section A21 and the electronic control section B22, and the power source section side power source connecters which are engaged to be detachable from the control section side power source connecters 15A and 15B, and which are connected through the first and second power source harnesses to the vehicle power source section (the battery) is required as described above. It is required to avoid the erroneous assembly of the first and second control section side power source connecters 15A and 15B, and the power source section side power source connecters.

In a case where the external appearance shapes of the control section side power source connecters 15A and 15B and the power source section side power source connecters of the respective systems are formed into utterly different shapes as shown in FIG. 2 and FIG. 3 for avoiding the erroneous assembly of the control section side power source connecters and the power source section side power source connecters, the distinguishment is easy. However, it is preferable that the external appearance shapes are identical to each other in consideration of the mass productivity of the respective power source connecters, and so on.

However, in a case where the control section side power source connecter and the power source section side power source connecter of the respective systems are formed into the identical shape, the vibration acted to the control section side power source connecter and the power source section side power source connecter, and the mechanical influence of the external force such as the interference of the external device become identical. Consequently, the control section side power source connecter and the power source section side power source connecter of the respective systems may be malfunctioned at the same time.

For handling the above-described problems in the present invention, the electronic control section constituting the redundant system includes two control section side power source connecters having the identical configuration. One of the control section side power source connecters and the other of the control section side power source connecters have different axial lengths. The power source section side power source connecters which are common to the respective control section side power source connecters are provided at tip ends of the power source harnesses having lengths determined to correspond to the above-described axial lengths. The power source section side power source connecters are engaged with the respective control section side power source connecters to correspond to the lengths of the power source harnesses.

With this, the power source section side power source connecters are connected with the control section side power source connecters in accordance with the lengths of the power source harnesses. Accordingly, it is possible to suppress the erroneous assembly. Moreover, the axial lengths of the respective control section side power source connecters are different from each other. Accordingly, the influential circumstances based on the external force and so on are different from each other. Consequently, it is possible to decrease the possibility of the instantaneous malfunction.

Figure 6:
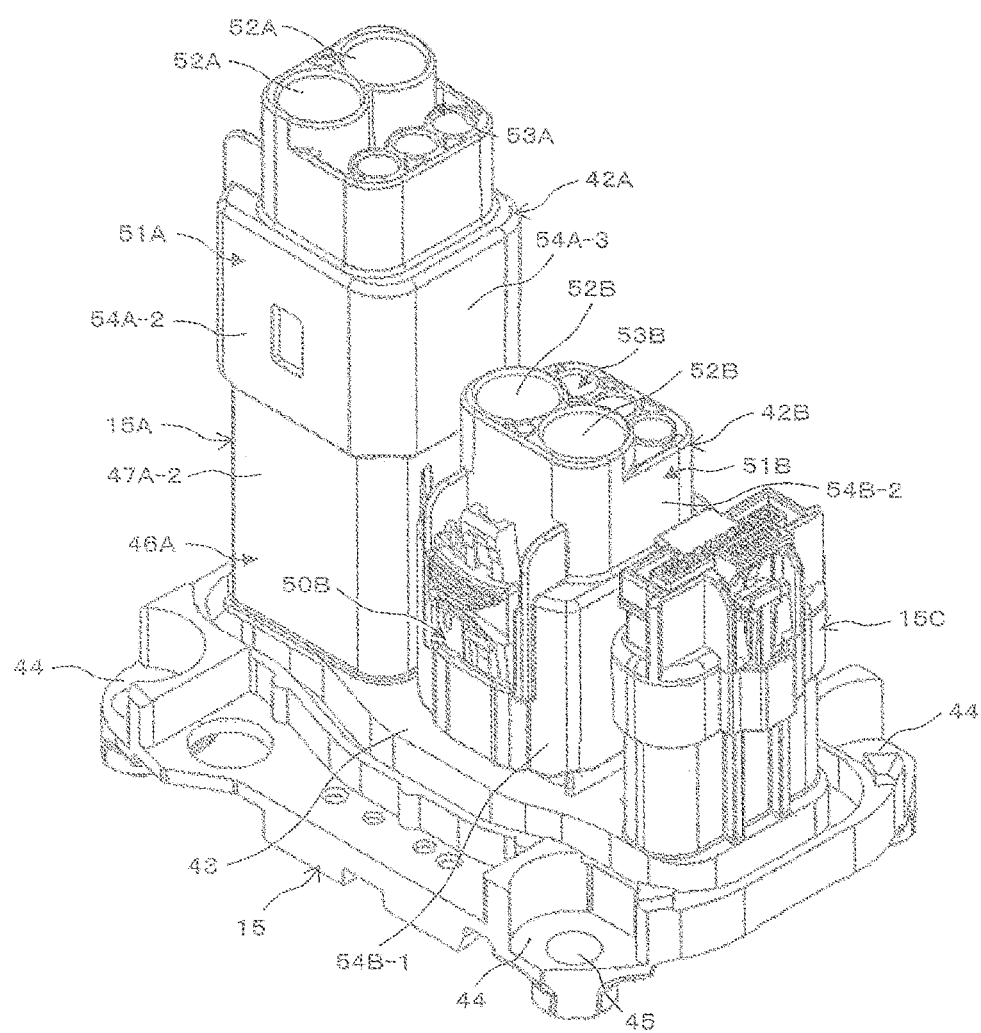
FIG. 6 is a perspective view showing a state after the control section side power source connector and the power source section side power source connector are engaged with each other.
Figure 7:
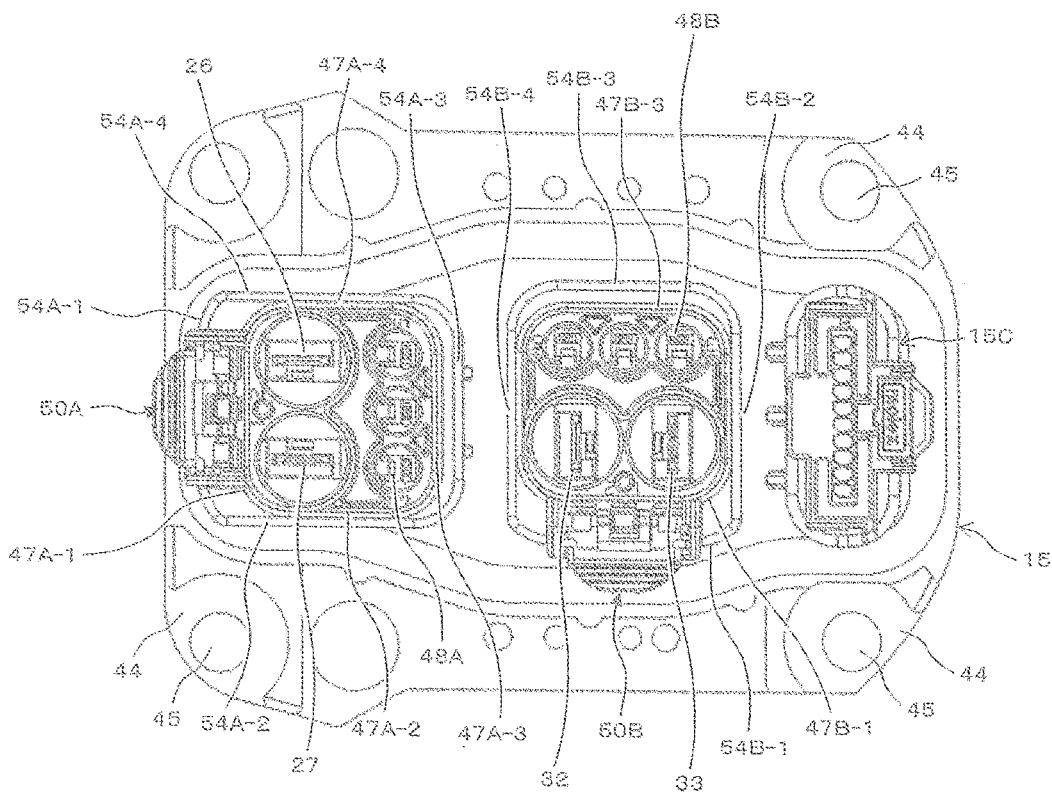
FIG. 7 is a top view showing a connector terminal assembly when viewed from the power source section power source side shown in FIG. 6.

Hereinafter, one embodiment according to the present are explained with reference to the drawings. Firstly, FIG. 5 to FIG. 7 show the first and second control section side power source connecters 15A and 15B provided to the connecter terminal assembly 15, and the first and second power source section side power source connecters 42A and 42B engaged with and detachable from the first and second control section side power source connecters 15A and 15B.

Figure 5:
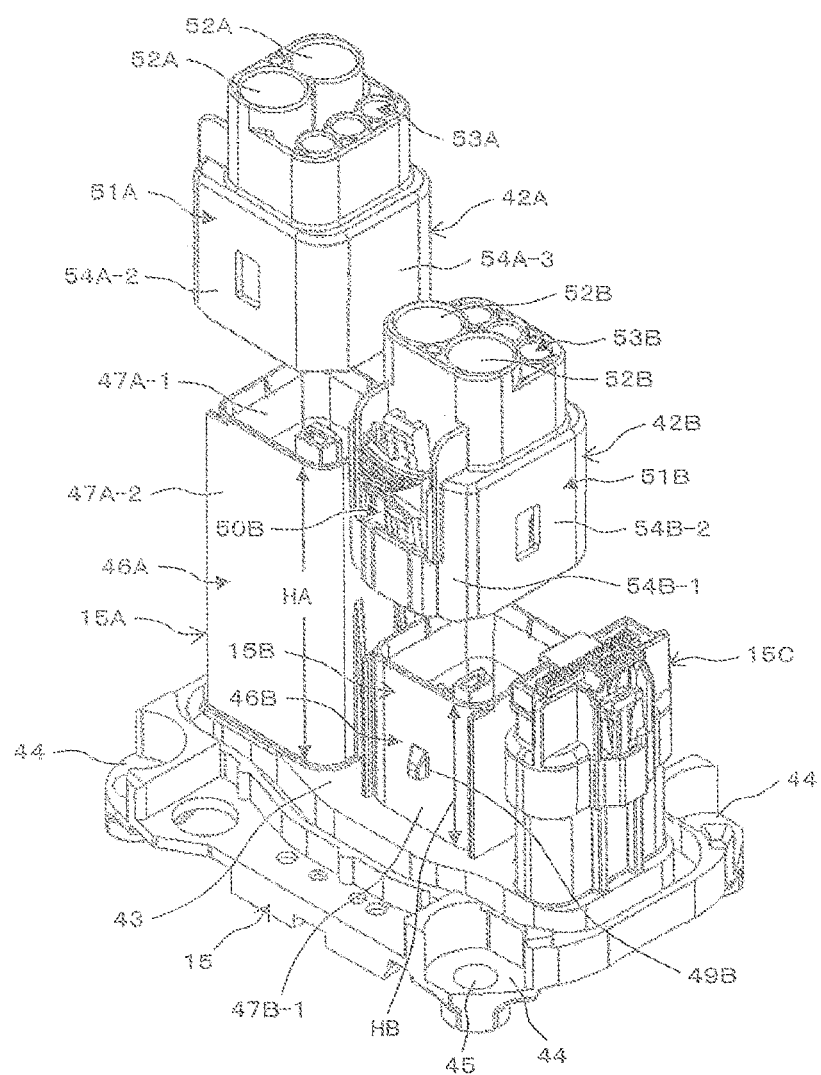
FIG. 5 is a perspective view showing a state before a control section side power source connector and a power source section side power source connector are engaged with each other.

FIG. 5 shows a state before the first and second control section side power source connecters 15A and 15B and the first and second power source section side power source connecters 42A and 42B are engaged with each other. FIG. 6 shows a state after the first and second control section side power source connecters 15A and 15B and the first and second power source section side power source connecters 42A and 42B are engaged with each other. FIG. 7 shows a state of FIG. 6 when viewed from the first and second power source section side power source connecters 42A and 42B side. Besides, the first and second power source harnesses connected to the vehicle power source section (the battery), and the control signal harness are omitted in the drawing.

As shown in FIG. 4, the power source terminal A26 and the ground terminal A27 are installed in the first control section side power source connecter 15A. The power source terminal B32 and the ground terminal B33 are installed in the second control section side power source connecter 15B. For example, the respective terminals A26, A27, B32B, and 33 may be installed by the insertion molding of the synthetic resin. Alternatively, the only respective terminals A26, A27, B32B, and 33 are insertion-molded to the synthetic resin. This is received and installed in the first and second control section side power source connecters 15A and 15B.

Moreover, as shown in FIG. 4, the power source terminal A38 and the ground terminal A39 are installed in the first power source section side power source connecter 42A. The power source terminal B40 and the ground terminal B41 are installed in the second power source section side power source connecter 42B. In this case, the first and second power source harnesses connected to the vehicle power source section (the battery) are connected to the first and second power source section side power source connecters 42A and 42B although these are omitted in the drawing.

The connecter terminal assembly 15 includes a flat surface region portion 43. The flat surface region portion 43 includes fixing portions 44 which are formed at four corners. Each of the fixing portions 44 includes an insertion hole 45 into which a fixing bolt (not shown) is inserted. The inserted fixing bolts are screwed to the end surface wall portion 17 of the motor housing 13. With this, the connecter terminal assembly 15 is fixed to the end surface wall portion 17.

The first control section side power source connecter 15A, the second control section side power source connecter 15B, and the detection sensor connecter 15C are planted into the flat surface region portion 43 of the connecter terminal assembly 15 to extend in a direction perpendicular to the flat surface region portion 43 (hereinafter, this is defined as an axial direction of the connecter). Moreover, the first control section side power source connecter 15A, the second control section side power source connecter 15B, and the detection sensor connecter 15C are linearly disposed along the longitudinal direction of the flat surface region portion 43.

The first control section side power source connecter 15A and the second control section side power source connecter 15B have the identical shape of sections perpendicular to the axial direction. The first control section side power source connecter 15A and the second control section side power source connecter 15B include cylindrical portions 46A and 46B which have the substantially square section, and which are made from the synthetic resin.

As shown in FIG. 7, the cylindrical portion 46A of the first control section side power source connecter 15A are constituted by four flat surface walls 47A-1 to 47A-4 which are perpendicular to each other. Moreover, the power source terminal A26 and the ground terminal A27 shown in FIG. 4 are received within the cylindrical portion 46A. Moreover, the motor control terminal 48A is received within the cylindrical portion 46A.

Similarly, the cylindrical portion 46B of the second control section side power source connecter 15B are constituted by four flat surface walls 47B-1 to 47B-4 which are perpendicular to each other. Moreover, the power source terminal B32 and the ground terminal B33 shown in FIG. 4 are received within the cylindrical portion 468. Moreover, the motor control terminal 48B is received within the cylindrical portion 46A.

As shown in FIG. 7, the power source terminal A26 and the ground terminal A27 received within the first control section side power source connecter 15A are disposed along the outer flat surface wall 47A-1 perpendicular to the longitudinal direction of the flat surface region portion 43. The motor control terminal 48A disposed along the flat surface wall 47A-3 on a side opposite to the flat surface wall 47A-1.

On the other hand, the power source terminal B32 and the ground terminal B33 received within the second control section side power source connecter 15B are disposed along the outer flat surface wall 47B-1 perpendicular to the longitudinal direction of the flat surface region portion 43. The motor control terminal 48B is disposed along the flat surface wall 47B-3 on a side opposite to the flat surface wall 47B-2.

As shown in FIG. 5, the outer flat surface wall 47B-1 constitutes the cylindrical portion 46B of the second control section side power source connecter 15B. The outer flat surface wall 47B-1 extends along longitudinal direction of the flat surface region portion 43. The outer flat surface wall 47B-1 includes a retaining claw portion (locking claw portion) 49B. The retaining claw portion 49B is engaged with a retaining portion 50B constituted by a retaining hole formed in the second power source section side power source connecter 42B, so as to retain the second power source section side power source connecter 42B.

Similarly, the outer flat surface wall 47A-1 constitutes the cylindrical portion 46A of the first control section side power source connecter 15A. The outer flat surface wall 47A-1 is perpendicular to the longitudinal direction of the flat surface region portion 43. The outer flat surface wall 47A-1 includes a retaining claw portion (locking claw portion) 49A (not shown). The retaining claw portion 49A is engaged with a retaining portion 50A (cf. FIG. 7) constituted by a retaining hole formed in the first power source section side power source connecter 42A, so as to retain the first power source section side power source connecter 42A.

In this way, the retaining claw portion 49A and 49B are formed on the outer flat surface wall 47A-1 of the cylindrical portion 46A which is perpendicular to the longitudinal direction of the flat surface region portion 43, and the outer flat surface wall 47B-1 of the cylindrical portion 46B which extends along the longitudinal direction of the flat surface region portion 43. With this, as shown in FIG. 7, the retaining portion 50A of the first power source section side power source connecter 42A, and the retaining portion 50B of the second power source section side power source connecter 42B are not positioned on the confronting surfaces of the cylindrical portion 46A and the cylindrical portion 46B, and the confronting surfaces of the cylindrical portion 46B and the detection sensor connecter 15C. With this, it is possible to shorten the longitudinal lengths of the first control section side power source connecter 15A, the second control section side power source connecter 15B, and the detection sensor connecter 15C.

As shown in FIG. 5, a height (HA) of the cylindrical portion 46A of the first control section side power source connecter 15A, and a height (HB) of the cylindrical portion 46B of the second control section side power source connecter 15B are set to be different from each other when viewed in the respective axial directions. In this embodiment, in the first control section side power source connecter 15A, the second control section side power source connecter 15B, and the detection sensor connecter 15C which are linearly disposed along the longitudinal direction of the flat surface region portion 43, the axial height (HA) of the cylindrical portion 46A of the first control section side power source connecter 15A which is disposed on the outer side is higher than the axial height (HB) of the cylindrical portion 46B of the second control section side power source connecter 15B which is disposed on the middle.

In this way, the axial height (HA) of the cylindrical portion 46A of the first control section side power source connecter 15A which is disposed on the outer side is high. With this, the second power source section side power source connecter 42B engaged with the cylindrical portion 46B of the adjacent second control section side power source connecter 15B can be avoided from the mechanical interference due to the other external devices and the flying objects.

For example, in a case where the other external devices and the flying objects come from the cylindrical portion 46A side of the first control section side power source connecter 15A, even when the first control section side power source connecter 15A is broken, it is possible to avoid the breakage of the second control section side power source connecter 15B. Conversely, in a case where the axial height (HB) of the cylindrical portion 46B of the second control section side power source connecter 15B is set to be high, both of the first control section side power source connecter 15A and the second control section side power source connecter 15B may be broken. In this way, it is possible to decrease the malfunction of the second control section side power source connecter 15B.

Figure 8:
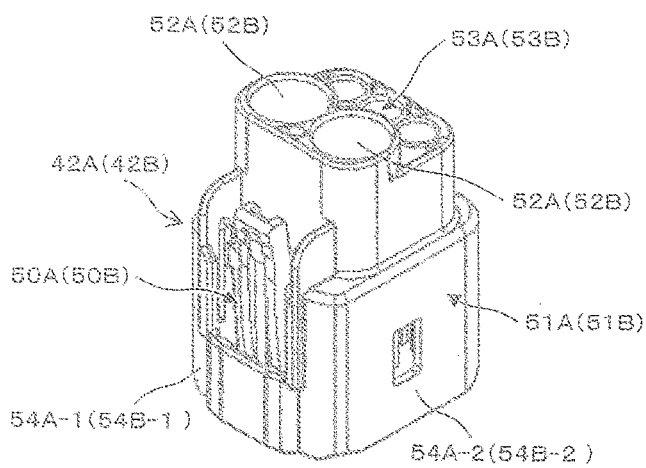
FIG. 8 is a perspective view showing the power source side power source connecter.

Next, the configurations of the first and second power source section side power source connecters 42A and 42B are explained. FIG. 8 shows the first power source section side power source connecters 42A and the second power source section side power source connecters 42B. These are formed into the identical shape. Accordingly, hereinafter, these are explained as the common power source side power source connecter.

The power source section side power source connecter 42A (42B) includes a cylindrical portion 51A (51B) which has a rectangular section perpendicular to the axial direction, and which covers the cylindrical portion 46A of the first control section side power source connecter 15A and the cylindrical portion 46B of the second control section side power source connecter 15B from the outer side. Accordingly, it is possible to engage the power source section side power source connecter 42A (42B) and the first and second control section side power source connecters 15A and 15B by inserting the cylindrical portion 51A (51B) of the power source section side power source connecter 42A (42B) onto the outer sides of the cylindrical portion 46A of the first control section side power source connecter 15A and the cylindrical portion 46B of the second control section side power source connecter 15B.

The cylindrical portion 51A (51B) includes a power source harness connection portion 52A (52B) and a control harness connection portion 53A (53B) which are disposed on a side opposite to the side on which the cylindrical portion 51A (51B) is inserted onto the cylindrical portion 46A of the first control section side power source connecter 15A, and the cylindrical portion 46B of the second control section side power source connecter 15B. The first and second power source harnesses are connected to the power source harness connection portion 52A (52B). The motor control harness is connected to the control harness connection portion 53A (53B). Besides, the control harness connection portion 53A (53B) to which the motor control harness is connected may be omitted as needed.

Moreover, as shown in FIG. 7, the cylindrical portion 51A (51B) is constituted by four flat surface walls 54A-1 to 54A-4 (52B-1 to 52B-4). The retaining portion 50A (50B) engaged with the retaining claw portions 49A and 49B (cf. FIG. 5) are formed on the flat surface wall 54A-1 (54B-1) on which the power source harness connection portion 52A (52B) is formed.

Figure 9:
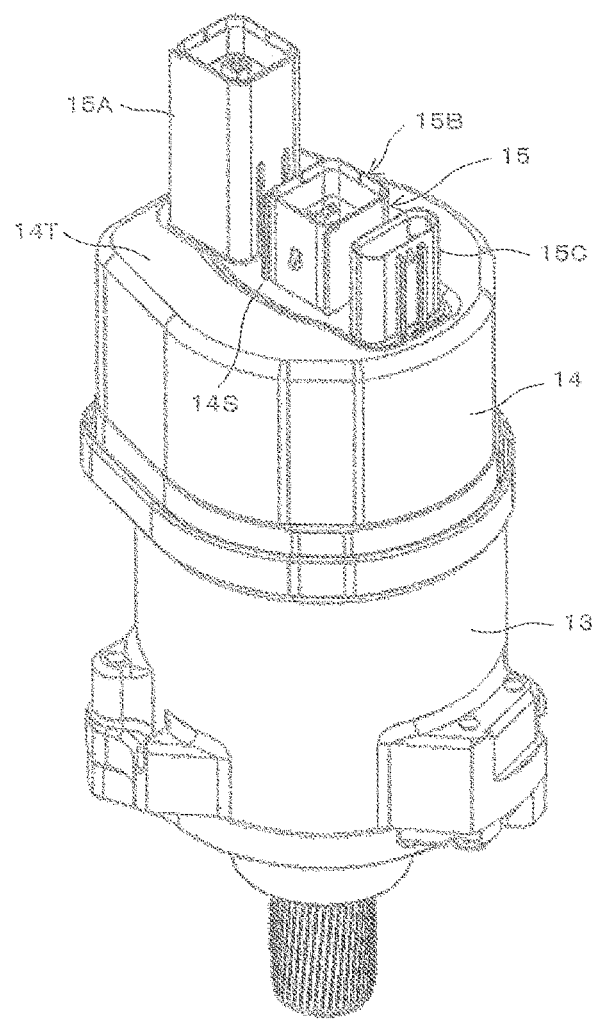
FIG. 9 is a perspective view showing the electric power steering device to which the connecter terminal assembly is assembled.

FIG. 9 shows a state where the connecter terminal assembly 15 having the above-described configuration is assembled to the electric power steering device 7. In FIG. 9, the electronic control section ECU (cf. FIG. 3) is assembled to the motor housing 13. The motor housing 13 is sealed by the metal cover 14 from the outer side. The metal cover 14 includes a top portion 14T having an opening 14S. The first control section side power source connecter 15A, the second control section side power source connecter 15B, and the detection sensor connecter 15C which are formed in the connecter terminal assembly protrude from the opening 14S along the axis of the rotation shaft of the electric motor to be exposed from the opening 14S. In this state, the axial height (HA) of the first control section side power source connecter 15A is higher than the axial height (HB) of the second control section side power source connecter 15B, as described above.

Figure 10:
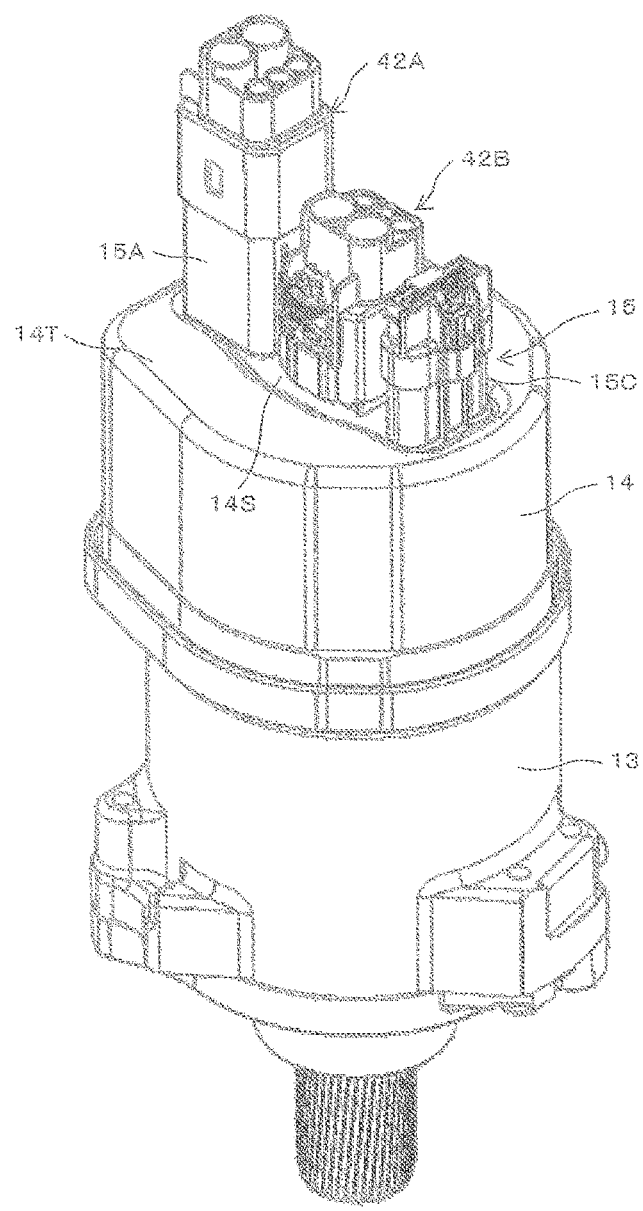
FIG. 10 is a perspective view showing a state where the power source section side power source connecter is engaged to the connecter terminal assembly of the electric power steering device shown in FIG. 9.

Next, as shown in FIG. 10, the first and second power source section power source connecters 42A and 42B are engaged with the connecter terminal assembly 15 in this state. The first control section side power source connecter 15A is electrically connected to the power source section side power source connecter 42A. Moreover, the second control section side power source connecter 15B is electrically connected to the second power source section side power source connecter 42B.

In this way, the axial height (HA) of the first control section side power source connecter 15A is different from the axial height (HB) of the second control section side power source connecter 15B. Accordingly, the lengths of the first and second power source harnesses are determined in accordance with the above relationship. Consequently, in a case where the first power source section side power source connecter 42A provided at the tip end of the first power source harness is erroneously assembled to the second control section side power source connecter 15B, and where the second power source section side power source connecter 42B provided at the tip end of the second power source harness is erroneously assembled to the first control section side power source connecter 15A, it is possible to readily judge the erroneous assembly since the first and second power source harnesses have different lengths. Moreover, it is possible readily perform the reassembling operation.

Moreover, the axial lengths of the first control section side power source connecter 15A and the second control section side power source connecter 15B have the different axial lengths. Accordingly, in a state where the first and second power source section side power source connecter 42A and 42B are engaged with each other, the disposition circumstance of the first control section side power source connecter 15A and the first power source section side power source connecter 42A, and the disposition circumstance of the second control section side power source connecter 15B and the second power source section side power source connecter 42B are different from each other. Therefore, it is possible to decrease the probability that the abnormality or the malfunction is instantaneously generated in these power source connecters. For example, even when the abnormality is generated in one of the power source connecters by the vibration mode, the other of the power source connecters does not receive the influence of this vibration mode. Consequently, the possibility of the generation of the instantaneous abnormality is decreased.

On the other hand, in a case where the first control section side power source connecter 15A and the second control section side power source connecter 15B have the identical axial height, the disposition circumstance of the first control section side power source connecter 15A and the first power source section side power source connecter 42A, and the disposition circumstance of the second control section side power source connecter 15B and the second power source section side power source connecter 42B are identical to each other. Accordingly, in the vibration mode, the abnormality may be generated in both of these.

For example, in a case where the other external devices and the flying objects come from the cylindrical portion 46A side of the first control section side power source connecter 15A, even when the first control section side power source connecter 15A is broken, it is possible to avoid the breakage of the second control section side power source connecter 15B. Conversely, in a case where the axial height (HB) of the cylindrical portion 46B of the second control section side power source connecter 15B is set to be high, both of the first control section side power source connecter 15A and the second control section side power source connecter 15B may be broken. In this way, it is possible to decrease the malfunction of the second control section side power source connecter 15B.

Moreover, the first and second power source section side power source connecters 42A and 42B are used in common in the first control section side power source connecter 15A and the second control section side power source connecter 15B. Accordingly, this is advantageous in the mass productivity of the power source section side power source connecter.

Besides, in the above-described embodiment, the power source connector is explained. However, the present invention is applicable to other connecters. In this case, the control section side power source connecter is reworded to "control section side connecter". The power source section side power source connecter is reworded to "non-control section side connecter". The power source harness is merely reworded to "harness".

As described above, the present invention includes the following features. Moreover, the following operations and effects can be attained by these features.

In the present invention, the device includes the electronic control section including a first electronic control section and a second electronic control section which constitute a redundant system, the first electronic control section and the second electronic control section being provided with a first control section side connecter and a second control section side connecter which have an identical configuration, the first control section side connecter and the second control section side connecter which have different axial lengths in a direction in which the respective connecters extend (hereinafter, referred to as an axial direction), a first non-control section side connecter and a second non-control section side connecter which are common to the first control section side connecter and the second control section side connecter, and which are provided at tip ends of a first harness and a second harness that have lengths determined in accordance with the axial heights of the first control section side connecter and the second control section side connecter, the first non-control section side connecter being engaged with the first control section side connecter, and the second non-control section side connecter being engaged with the second control section side connecter to correspond to the lengths of the first harness and the second harness.

In the present invention, the device includes the electronic control section including a first electronic control section and a second electronic control section which constitute a redundant system, and which are connected to a vehicle power source section; the first electronic control section and the second electronic control section being provided with a first control section side power source connecter and a second control section side power source connecter which have an identical configuration, the first control section side power source connecter and the second control section side power source connecter which have different axial lengths in a direction in which the respective power source connecters extend (hereinafter, referred to as an axial direction), a first power source section side power source connecter and a second power source section side power source connecter which are common to the first control section side power source connecter and the second control section side power source connecter, and which are provided at tip ends of a first power source harness and a second power source harness that have lengths determined in accordance with the axial heights of the first control section side power source connecter and the second control section side power source connecter, the first power source section side power source connecter being engaged with the first control section side power source connecter, and the second power source section side power source connecter being engaged with the second control section side power source connecter to correspond to the lengths of the first power source harness and the second power source harness.

By these inventions, the non-control section side connecter (the power source section side power source connecter) is connected to the control section side connecter (the control section side power source connecter) in accordance with the length of the harness (the power source harness. Accordingly, it is possible to suppress the erroneous assembly. Moreover, the axial lengths of the respective control section side connecters have the different lengths. The mechanical influences based on the external force and so on are different from each other. Therefore, it is possible to decrease the possibility of the instantaneous malfunctions.

Besides, the present invention is not limited to the above-described embodiment. Various variations are included in the present invention. For example, the above-described embodiment is explained in detail for easy understanding the present invention. The present invention is not limited to the configuration including the entire explained configurations. Moreover, a part of the configuration of the embodiment can be replaced by the configuration of the other embodiment. Furthermore, the configuration of the other embodiment can be added to the configuration of the embodiment. Moreover, the configuration of the other embodiment can be added to, deleted from, and replaced by a part of the configuration of the embodiments.

EXPLANATION OF SYMBOLS

7 . . . electric power steering device, 11 . . . electric motor section, 12 . . . electronic control section, 13 . . . motor housing, 14 . . . cover, 15 . . . connecter terminal assembly, 15A . . . first control section side power source connecter, 15B . . . second control section side power source connecter, 15C . . . detection sensor connecter, 17 . . . end surface wall portion, 18 . . . electric power conversion circuit substrate, 19 . . . power source circuit section, 20 . . . control circuit substrate, 21 . . . first electronic control section, 22 . . . second electronic control section, 26, 32, 38, 40 . . . power source terminals, 27, 33, 39, 41 . . . ground terminal, 42A . . . first power source section side power source connecter, 42B . . . second power source section side power source connecter, 46A . . . cylindrical portions, 46B . . . cylindrical portion, 49A, 49B . . . retaining claw portions, 50A, 50B . . . retaining claw portions, 51A . . . cylindrical portions, 51B . . . cylindrical portion

The invention claimed is:

1. An electric drive device comprising:
   an electric motor configured to drive a mechanical control element;
   a motor housing in which the electric motor is received;
   an electronic control section disposed on a side of an end surface wall portion of the motor housing which is a side opposite to an output portion of a rotation shaft of the electric motor, and configured to drive the electric motor; and
   the electronic control section including a first electronic control section and a second electronic control section which constitute a redundant system, and which are connected to a vehicle power source section;
   the first electronic control section and the second electronic control section being provided with a first control section side power source connecter and a second control section side power source connecter which have an identical configuration, the first control section side power source connecter and the second control section side power source connecter which have different axial lengths in a direction in which the respective power source connecters extend (hereinafter, referred to as an axial direction), a first power source section side power source connecter and a second power source section side power source connecter which are common to the first control section side power source connecter and the second control section side power source connecter, and which are provided at tip ends of a first power source harness and a second power source harness that have lengths determined in accordance with the axial heights of the first control section side power source connecter and the second control section side power source connecter, the first power source section side power source connecter being engaged with the first control section side power source connecter, and the second power source section side power source connecter being engaged with the second control section side power source connecter to correspond to the lengths of the first power source harness and the second power source harness, wherein the electronic control section includes a detection sensor connecter in addition to the first control section side power source connecter, and the second control section side power source connecter; the first control section side power source connecter, the second control section side power source connecter, and the detection sensor connecter are planted in a flat surface region portion of a connecter terminal assembly; and these connecters are linearly disposed in an order of the first control section side power source connecter, the second control section side power source connecter, and the detection sensor connecter along a longitudinal direction of the flat surface region portion.

2. The electric drive device as claimed in claim 1, wherein each of the first control section side power source connecter, and the second control section side power source connecter is formed into a cylindrical member constituted by four flat surface walls which are perpendicular to each other, in a section perpendicular to the axial direction; one of the flat surface walls of the respective cylindrical member includes an engagement claw portion configured to be engaged with the first power source section side power source connecter, and the second power source section side power source connecter; and the respective engagement claw portions are formed on the flat surface wall which is other than the confronting flat surface wall of the respective cylindrical members of the first control section side power source connecter and the second control section side power source connecter.

3. The electric drive device as claimed in claim 1, wherein an axial height of the first control section side power source connecter is set to be higher than an axial height of the second control section side power source connecter.

4. The electric drive device as claimed in claim 1, wherein each of the first control section side power source connecter, and the second control section side power source connecter is formed into a cylindrical member constituted by four flat surface walls which are perpendicular to each other, in a section perpendicular to the axial direction; one of the flat surface walls of the respective cylindrical member includes an engagement claw portion configured to be engaged with the first power source section side power source connecter, and the second power source section side power source connecter;

the respective engagement claw portions are formed on the flat surface wall which is other than the confronting flat surface wall of the respective cylindrical members of the first control section side power source connecter and the second control section side power source connecter;

the engagement claw portion of the first control section side power source connecter is provided on the flat surface wall perpendicular to the longitudinal direction of the flat surface region portion; and the engagement claw portion of the second control section side power source connecter is provided on the flat surface wall along the longitudinal direction of the flat surface region portion.

5. An electric power steering device comprising:

an electric motor configured to provide a steering assist force to a steering shaft based on an output from a torque sensor configured to sense a pivot direction and a pivot torque of the steering shaft;

a motor housing in which the electric motor is received;

an electronic control section disposed on a side of an end surface wall of the motor housing which is a side opposite to an output portion of a rotation shaft of the electric motor, and configured to drive the electric motor; and a cover covering the electronic control section;

the electronic control section including a first electronic control section and a second electronic control section which constitute a redundant system, and which are connected to a vehicle power source section;

the first electronic control section and the second electronic control section being provided with a first control section side power source connecter and a second control section side power source connecter which have an identical configuration, the first control section side power source connecter and the second control section side power source connecter which have different axial lengths in a direction in which the respective power source connecters extend (hereinafter, referred to as an axial direction), a first power source section side power source connecter and a second power source section side power source connecter which are common to the first control section side power source connecter and the second control section side power source connecter, and which are provided at tip ends of a first power source harness and a second power source harness that have lengths determined in accordance with the axial heights of the first control section side power source connecter and the second control section side power source connecter, the first power source section side power source connecter being engaged with the first control section side power source connecter, and the second power source section side power source connecter being engaged with the second control section side power source connecter to correspond to the lengths of the first power source harness and the second power source harness, wherein the electronic control section includes a detection sensor connecter in addition to the first control section side power source connecter, and the second control section side power source connecter; the first control section side power source connecter, the second control section side power source connecter, and the detection sensor connecter are planted in a flat surface region portion of a connecter terminal assembly; and these connecters are linearly disposed in an order of the first control section side power source connecter, the second control section side power source connecter, and the detection sensor connecter along a longitudinal direction of the flat surface region portion.

6. The electric power steering device as claimed in claim 5, wherein each of the first control section side power source connecter, and the second control section side power source connecter is formed into a cylindrical member constituted by four flat surface walls which are perpendicular to each other, in a section perpendicular to the axial direction; one of the flat surface walls of the respective cylindrical member includes an engagement claw portion configured to be engaged with the first power source section side power source connecter, and the second power source section side power source connecter; and the respective engagement claw portions are formed on the flat surface wall which is other than the confronting flat surface wall of the respective cylindrical members of the first control section side power source connecter and the second control section side power source connecter.

7. The electric power steering device as claimed in claim 5, wherein an axial height of the first control section side power source connecter than an axial height of the second control section side power source connecter.

8. The electric power steering device as claimed in claim 5, wherein each of the first control section side power source connecter, and the second control section side power source connecter is formed into a cylindrical member constituted by four flat surface walls which are perpendicular to each other, in a section perpendicular to the axial direction; one of the flat surface walls of the respective cylindrical member includes an engagement claw portion configured to be engaged with the first power source section side power source connecter, and the second power source section side power source connecter;

the respective engagement claw portions are formed on the flat surface wall which is other than the confronting flat surface wall of the respective cylindrical members of the first control section side power source connecter and the second control section side power source connecter;

the engagement claw portion of the first control section side power source connecter is provided on the flat surface wall perpendicular to the longitudinal direction of the flat surface region portion; and the engagement claw portion of the second control section side power source connecter is provided on the flat surface wall along the longitudinal direction of the flat surface region portion.

* * * * *